United States Patent
Eren et al.

(10) Patent No.: US 9,543,859 B2
(45) Date of Patent: Jan. 10, 2017

(54) SYSTEM AND METHOD FOR ACTIVE/REACTIVE POWER COMPENSATION

(71) Applicants: Suzan Eren, Kingston (CA); Majid Pahlevaninezhad, Kingston (CA); Praveen Jain, Kingston (CA); Alireza Bakhshai, Kingston (CA)

(72) Inventors: Suzan Eren, Kingston (CA); Majid Pahlevaninezhad, Kingston (CA); Praveen Jain, Kingston (CA); Alireza Bakhshai, Kingston (CA)

( * ) Notice: Subject to any disclaimer, the term of this patent is extended or adjusted under 35 U.S.C. 154(b) by 139 days.

(21) Appl. No.: 14/604,412

(22) Filed: Jan. 23, 2015

(65) Prior Publication Data
US 2016/0218639 A1    Jul. 28, 2016

(51) Int. Cl.
*H02M 7/797*    (2006.01)
*H02M 7/5387*    (2007.01)

(52) U.S. Cl.
CPC ......... *H02M 7/797* (2013.01); *H02M 7/53871* (2013.01); *H02M 2007/53876* (2013.01)

(58) Field of Classification Search
CPC ............ H02M 1/12; H02M 1/42; H02M 7/42; H02M 7/48; H02M 7/53; H02M 7/66; H02M 7/68; H02M 7/797; H02M 7/53871; H02M 2007/53876
See application file for complete search history.

(56) References Cited

U.S. PATENT DOCUMENTS

| | | | |
|---|---|---|---|
| 7,508,173 B2 | 3/2009 | Zhou et al. | |
| 8,391,032 B2 | 3/2013 | Garrity et al. | |
| 8,774,974 B2 | 7/2014 | Chee et al. | |
| 8,823,212 B2 | 9/2014 | Garrity et al. | |
| 2005/0187752 A1* | 8/2005 | Colby ....................... | H03L 7/08 703/19 |
| 2009/0237964 A1* | 9/2009 | Serpa ...................... | H02M 1/12 363/40 |
| 2011/0013438 A1 | 1/2011 | Frisch et al. | |
| 2011/0088748 A1 | 4/2011 | Lee | |
| 2011/0130889 A1* | 6/2011 | Khajehoddin .......... | H02J 3/383 700/298 |
| 2012/0161513 A1* | 6/2012 | Ohshima ............. | H02M 7/1626 307/11 |
| 2012/0205981 A1 | 8/2012 | Varma et al. | |
| 2013/0147275 A1 | 6/2013 | Bettenwort et al. | |
| 2013/0208519 A1* | 8/2013 | Yamamoto .............. | H02M 7/12 363/67 |
| 2013/0234523 A1 | 9/2013 | Anichkov et al. | |
| 2014/0152110 A1* | 6/2014 | Sugimoto ................. | H02J 4/00 307/66 |

(Continued)

*Primary Examiner* — Fred E Finch, III
(74) *Attorney, Agent, or Firm* — Brion Raffoul

(57) ABSTRACT

Systems, methods, and devices for use with active/reactive power control in power conditioning systems. To provide quick active/reactive power control by way of a grid-connected inverter, an estimator estimates the P and Q coefficients based on an instantaneous power from the grid-connected inverter. The estimator receives grid current and voltage and estimates of the P and Q coefficients are used with reference P and Q values to determine whether active or reactive power needs to be injected to the grid. The P coefficient is a DC offset of the instantaneous power of the grid and the Q coefficient is the coefficient of a sine component of the instantaneous power.

13 Claims, 15 Drawing Sheets

(56) References Cited

U.S. PATENT DOCUMENTS

| | | | |
|---|---|---|---|
| 2014/0211529 A1 | 7/2014 | Kandasamy et al. | |
| 2014/0239726 A1 | 8/2014 | Fornage | |
| 2015/0198638 A1* | 7/2015 | Heikkila | H02P 21/22 702/60 |
| 2015/0365010 A1* | 12/2015 | Abe | H02M 1/36 363/37 |
| 2016/0006338 A1* | 1/2016 | Sakimoto | H02M 1/00 363/131 |
| 2016/0134202 A1* | 5/2016 | Lu | H02M 1/42 363/123 |

* cited by examiner

SYSTEM AND METHOD FOR ACTIVE/REACTIVE POWER COMPENSATION

TECHNICAL FIELD

The present invention relates to circuit and control systems for active/reactive power compensation in power converters. In particular, the present invention relates to methods, circuits, and devices for use in a renewable power conditioning system used for generating active and reactive power.

BACKGROUND OF THE INVENTION

In the near future, renewable energy sources such as wind energy and solar energy will be the main sources of power used in distributed generation platforms. Nowadays, renewable energy power conditioning systems primarily deliver active power to the utility grid, which means that the generated current is in phase with the grid voltage. However, the growing prevalence of renewable energy sources requires faster and more flexible active/reactive power control. Since renewable energy sources are intermittent in nature, fast active/reactive power control can compensate for deficiencies in the reliability of such energy sources. For example, if there is a fluctuation in the utility grid voltage, the immediate injection of reactive power can stabilize the voltage. Thus, for renewable energy sources to replace mainstream power generation and to become a reliable alternative, renewable energy power conditioning systems must be able to provide rapid active/reactive power control.

In single-phase power conditioning systems, active/reactive power control is conventionally performed either in the stationary reference frame or in the synchronous reference frame (i.e. synchronous with the grid voltage angle). FIG. 1 shows a control system in the stationary reference frame while FIG. 2 shows a control system in the synchronous (rotating) reference frame. In FIG. 1, the control variables are in the stationary reference frame and the control system consists of two cascaded loops. The first loop is a fast internal current control loop, which is responsible for regulating the converter output current (the grid current). This loop deals with power quality issues and current protection. The second loop is an external power control loop, which is responsible for regulating the active/reactive output power. In FIG. 2, the control variables are in the synchronous reference frame and the structure of the control system is similar to that of the stationary reference frame with one notable difference. Since the control variables are DC values, simple PI controllers can be used to regulate the output current. However, the necessity of having cross-coupling terms in the synchronous reference frame diminishes the precision of the control method.

The control system in the stationary reference frame and the control system in the synchronous reference frame both use the same method to determine whether active/reactive power is required. This method consists of measuring the average values of the active and reactive power for the external power control loop. In single-phase power conditioning systems, measuring the active/reactive power requires a low-pass filter with a low bandwidth in order to filter out the double frequency ripple inherent in the output power. This low-pass filter introduces a delay into the control system. This delay and its attendant slowness in reacting to conditions is the main drawback associated with conventional control systems as shown in FIG. 1 and FIG. 2. However, as renewable energy sources inevitably become more numerous and replace mainstream power generation, such energy sources must meet demands to provide smart grid functionality. Unfortunately, such functionality cannot be achieved with a sluggish control system. What is needed is a control system that is able to provide smart grid functionality using a fast and reliable closed-loop control system.

For clarity, it should be noted that smart grid functionality includes the following features: active voltage regulation, active power control, and fault ride-through capabilities. Active voltage regulation is implemented by controlling the reactive power injected into the utility grid in order to stabilize the grid voltage. Active power control is provided by controlling the active power injected into the utility grid in order to stabilize the grid frequency. Finally, fault ride-through is provided by allowing the renewable energy power conditioning system to remain connected to the utility grid and supply reactive power to support the utility grid voltage during fault/disturbance conditions. These features of smart grid functionality require rapid active/reactive power control. Thus, in order for a power conditioning control system to provide smart grid functionality, it must also be able to achieve fast active/reactive power control.

SUMMARY OF INVENTION

The present invention provides systems, methods, and devices for use with active/reactive power control in power conditioning systems. To provide quick active/reactive power control by way of a grid-connected inverter, an estimator estimates the P and Q coefficients based on an instantaneous power from the grid-connected inverter. The estimator receives grid current and voltage and estimates of the P and Q coefficients are used with reference P and Q values to determine whether active or reactive power needs to be injected to the grid. The P coefficient is a DC offset of the instantaneous power of the grid and the Q coefficient is the coefficient of a sine component of the instantaneous power.

In a first aspect, the present invention provides a control system for controlling a power inverter, the system comprising:
 an active power subcontroller, said active power subcontroller receiving a difference between a reference P value and an estimated P value, an output of said active power subcontroller being used to determine voltage and current outputs of said power inverter;
 a reactive power subcontroller, said reactive power subcontroller receiving a difference between a reference Q value and an estimated Q value, an output of said reactive power subcontroller being used to determine voltage and current outputs of said power inverter;
 an active/reactive power estimator for estimating said estimated P value and said estimated Q value based on outputs of said power inverter, said estimator receiving voltage and current outputs of said power inverter;
 wherein said P value is a DC offset of an instantaneous power of a power grid to which said power inverter is connected and said Q value is a coefficient of a sine component of said instantaneous power of said power grid.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
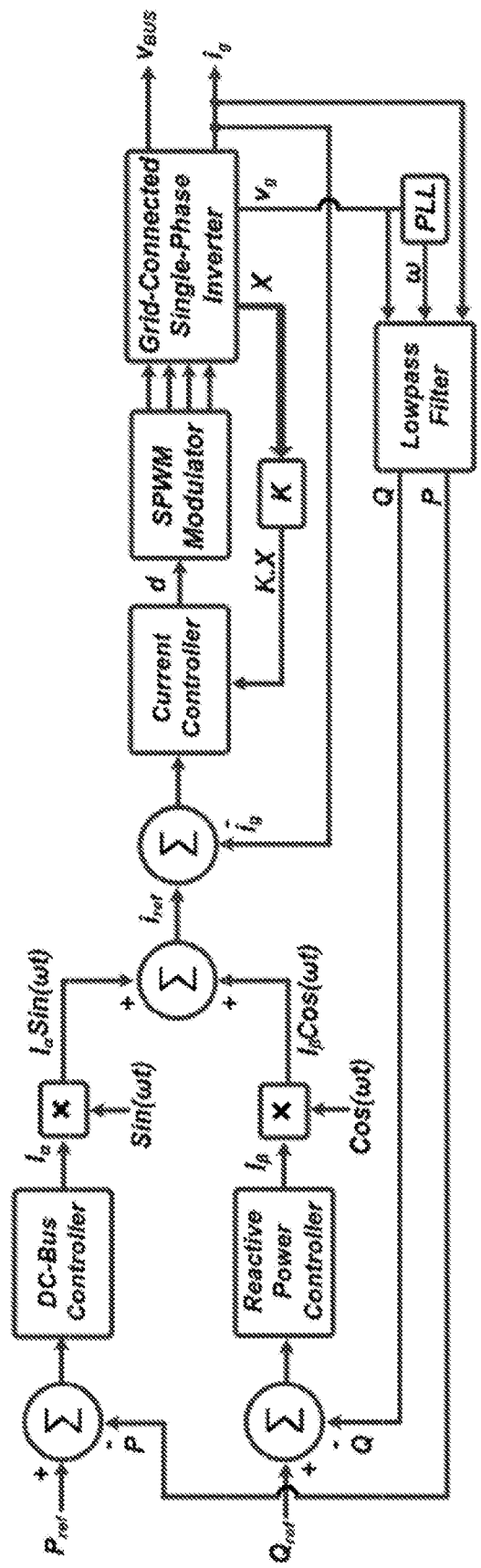
FIGS. 1 and 2 are block diagrams illustrating control systems according to the prior art.
Figure 2:
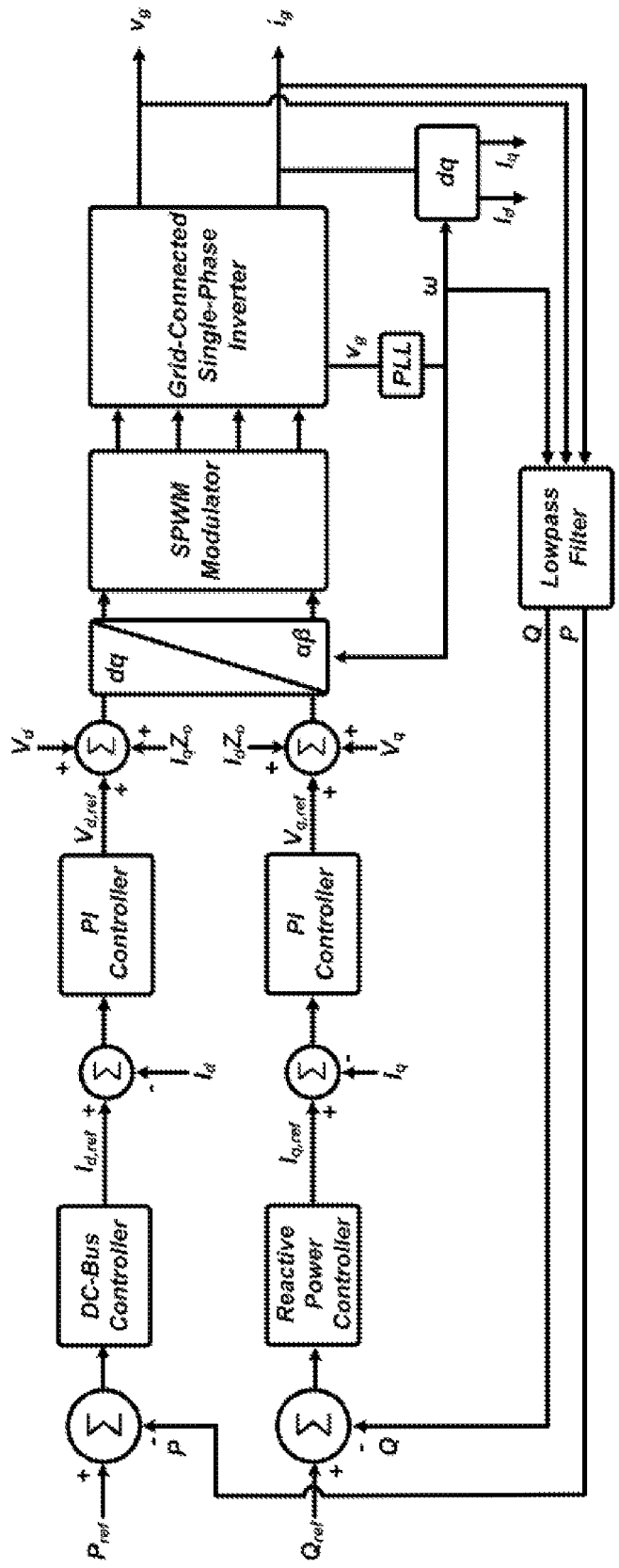
Figure 3:
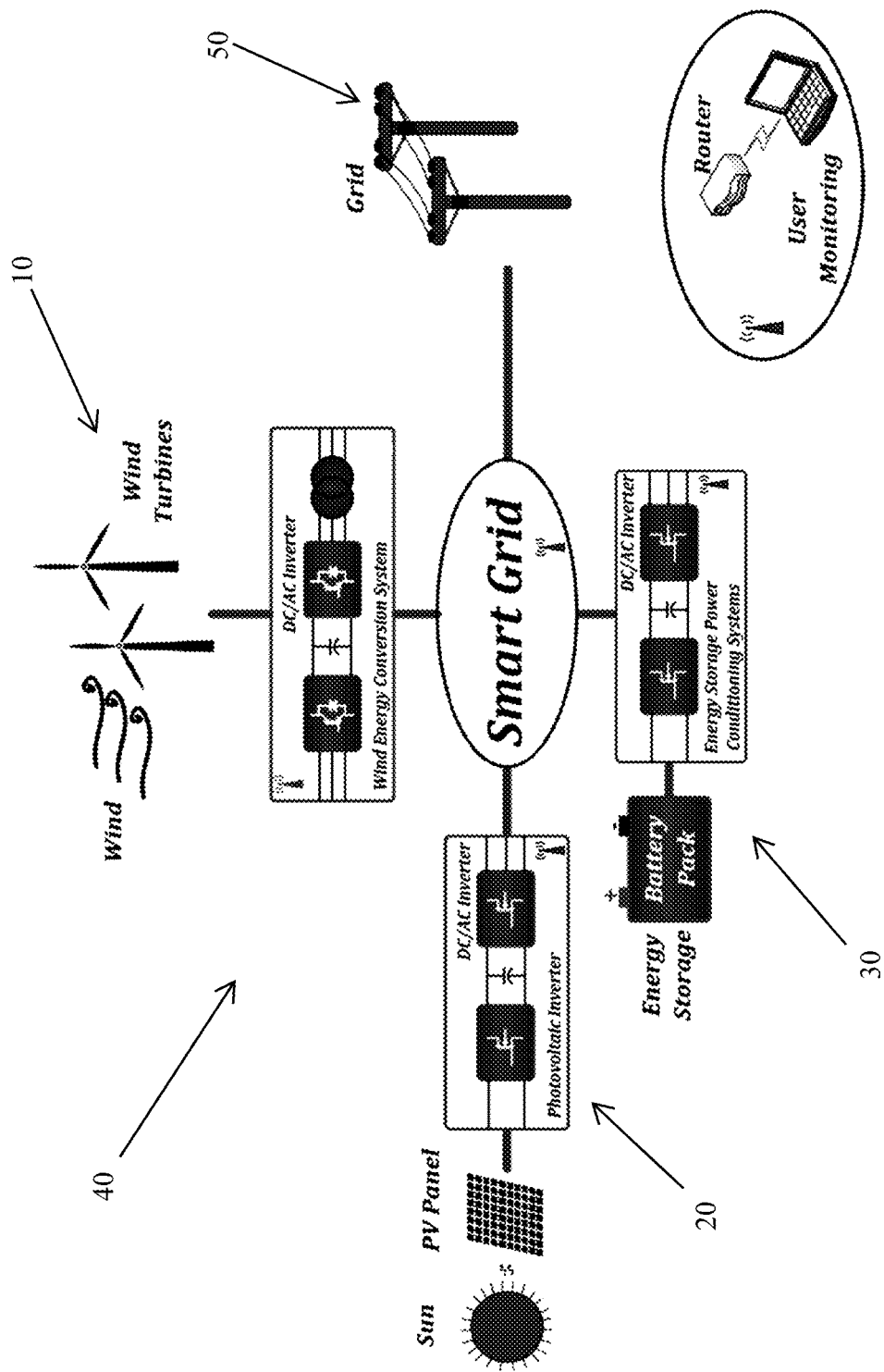
FIG. 3 is a block diagram of a hybrid renewable energy system in a smart grid platform.

DC/AC inverters are the interface between the utility grid and the renewable energy power conditioning system. Referring to FIG. 3, illustrated is a hybrid renewable energy generation system in a smart grid platform. In FIG. 3, a wind energy conversion system 10, a solar inverter 20, and an energy storage unit 30 are included in the hybrid renewable energy generation system 40. These three components perform intelligent energy management. Only during days is the solar inverter 20 producing power, whereas wind power generation by way of the wind energy conversion system 10 is more pronounced during nights. Therefore, the energy storage unit 30 is used to complement the renewable energy system. The energy storage unit 30 stores energy when the renewable energy sources produce more energy than is required and releases the stored energy to the grid 50 when there is a lack of energy. The interface between the three components (wind energy conversion system, solar inverter, and energy storage unit) and the utility grid is a DC/AC inverter.

Figure 4:
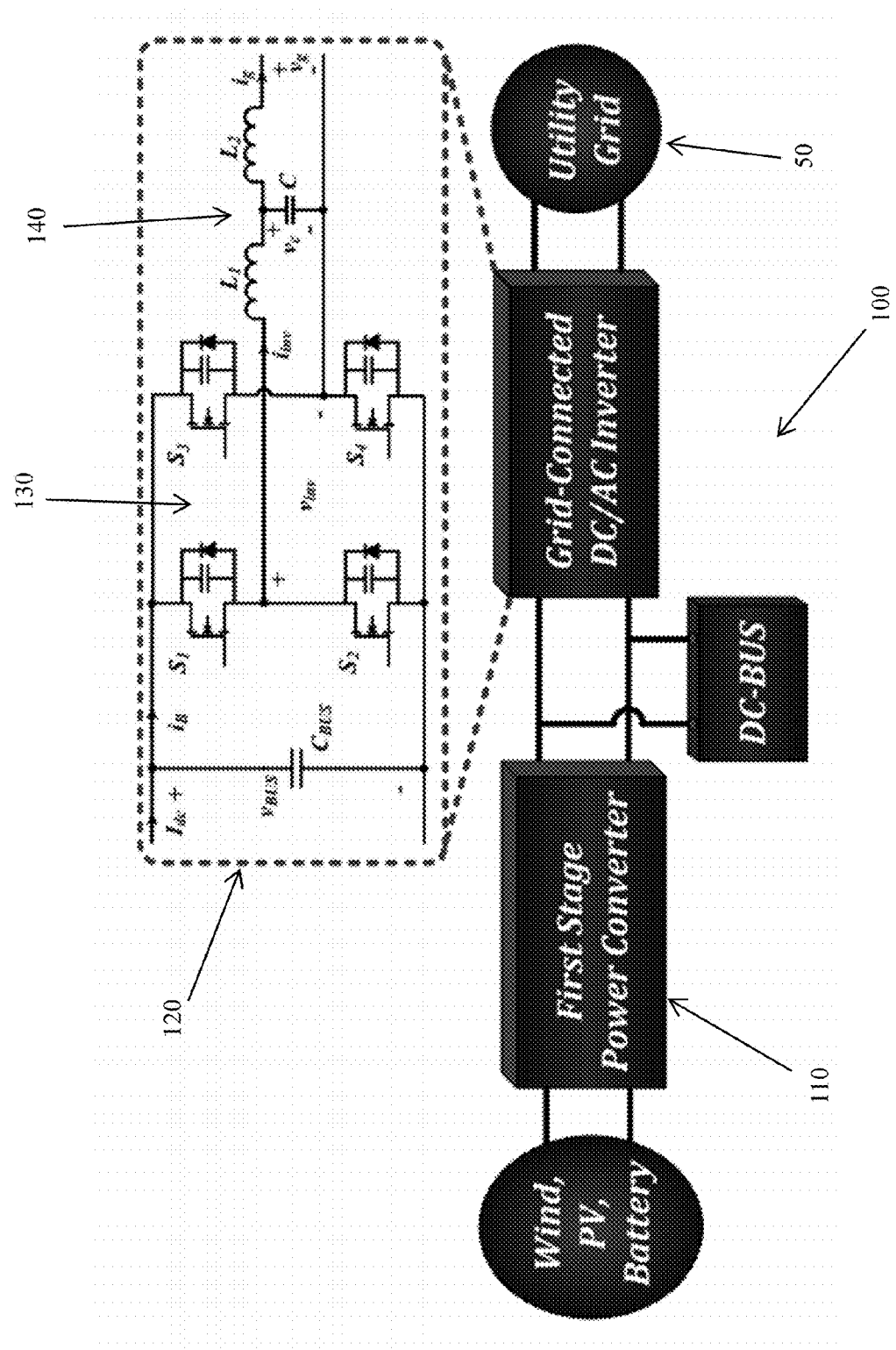
FIG. 4 is a block diagram of a power conditioning system for either renewable energy systems or for an energy storage unit.

Referring to FIG. 4, illustrated is a power conditioning system 100 used for either renewable energy systems or an energy storage unit. The power conditioning system 100 includes the first stage power converter 110, which is the interface between the power conditioning system 100 and either the renewable energy source or the battery in the case of the energy storage unit. FIG. 4 also shows the schematic of a single-phase grid-connected DC/AC inverter 120 in the power conditioning system 100. The DC/AC inverter 120 includes a full-bridge inverter 130 and a filter 140. This filter 140 is responsible for removing the switching harmonics in order for the DC/AC inverter 120 to be able to inject a high quality current into the utility grid 50. The filter can be either an L-filter or an LCL-filter. LCL-filters provide better attenuation than comparably sized L-filters or LC-filters (i.e., −60 dB/dec for LCL-filters and −20 dB/dec for L-filters).

Figure 5:
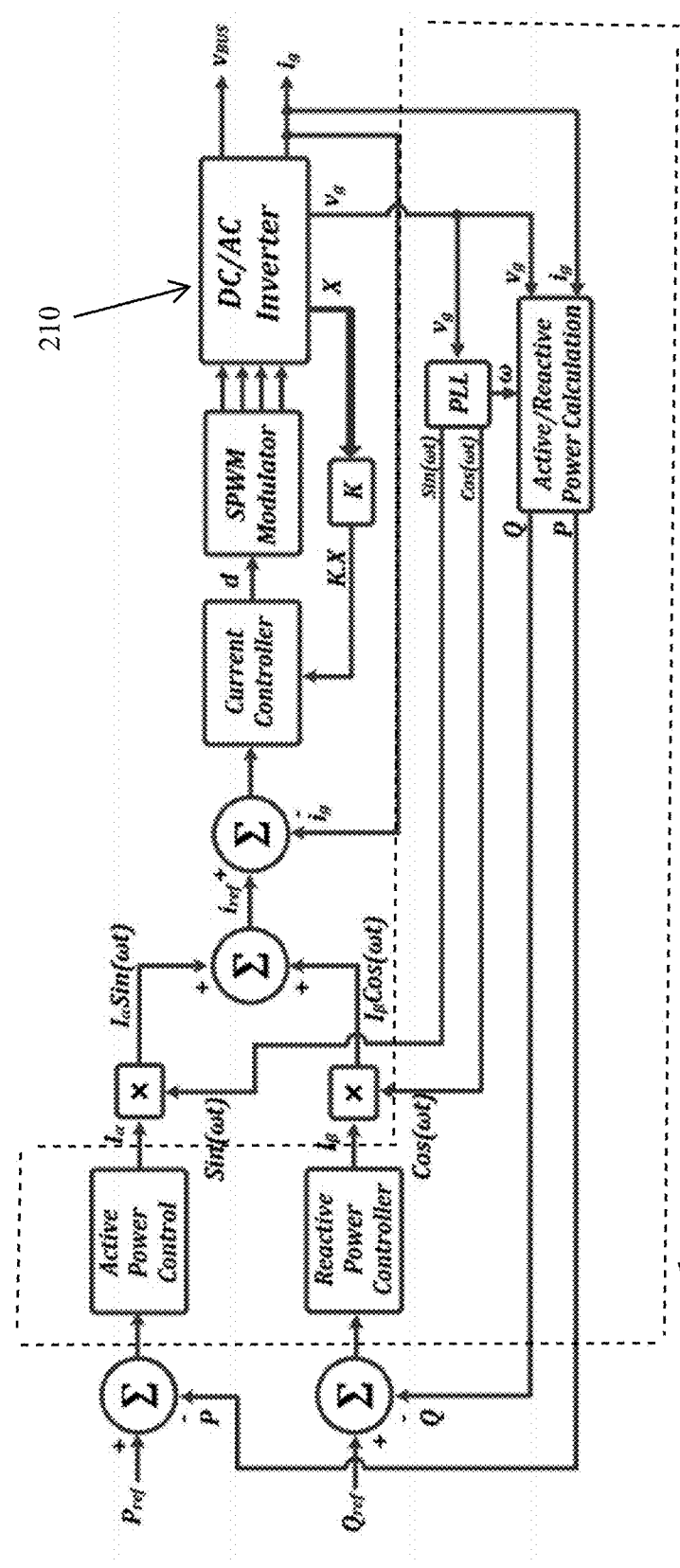
FIG. 5 is a block diagram of a closed loop control system for controlling a grid-connected DC/AC inverter.

Referring to FIG. 5, illustrated is a closed-loop control system for controlling active/reactive power to be fed to the grid 50 by way of the DC/AC inverter 210. The control system 200 uses external control loops which determine the reference signal for the internal current control loop. The two external control loops are the active power control loop and the reactive power control loop. The active power control loop usually regulates the DC-bus voltage in order to balance the active power flow. This loop determines the amplitude of the current component aligned with the grid voltage (i.e. in-phase with the grid voltage). The reactive power control loop determines the quadrature current component (i.e. 90° phase-shifted from the grid voltage). In one aspect of the present invention, provided is a new closed-loop control system which uses a novel hybrid estimator to precisely calculate the active and reactive power very quickly and robustly.

The equations to be used in describing the hybrid estimator are determined below.

In a single-phase system, the instantaneous power is given by:

$$p_{g,inst} = v_g i_g \quad (1)$$

where $v_g$ is the grid voltage and $i_g$ is the grid current. Let's consider the grid voltage and grid current to be as follows:

$$v_g = V \sin(\omega t) \quad (2)$$

$$i_g = I \sin(\omega t + \psi) \quad (3)$$

Thus, the instantaneous power is given by:

$$p_{g,inst} = P - P\cos(2\omega t) + Q\sin(2\omega t) \quad (4)$$

where $P = V_{rms} I_{rms} \cos(\psi)$ is the active power, and $Q = V_{rms} I_{rms} \sin(\omega)$ is the reactive power. According to (4), extracting P and Q from the feedback signals requires low pass filtering with a very low bandwidth. This will result in very sluggish transient performance, and an inability to actively provide functions, such as active voltage regulation, active power control, and low voltage fault ride-through as noted above. In one aspect of the present invention, provided is a hybrid estimator which is able to rapidly calculate the active and reactive power without using low-pass filtering.

In the systems used in the present invention, the state variables of the system are defined as:

$$x_1 = p_{g,inst} \quad (5)$$

$$x_2 = \frac{1}{2\omega} \dot{x}_1 \quad (6)$$

According to (4), the system dynamics can be derived as:

$$\dot{X} = F \cdot X + G \cdot \theta \quad (7)$$

where $\theta = P$, $X = \begin{pmatrix} x_1 \\ x_2 \end{pmatrix}$, $F = \begin{pmatrix} 0 & 2\omega \\ -2\omega & 0 \end{pmatrix}$, and $G = \begin{pmatrix} 0 \\ 2\omega \end{pmatrix}$.

In (7), $\theta = P$ is the unknown parameter. The problem in estimating $\theta$ is that $\theta$ appears in the second equation in (7), which determines the dynamics of $x_2$. Since $x_2$ is not measurable, it is not possible to precisely estimate $\theta$. The only observable state is $x_1 = p_{g,inst}$ (differentiating $x_1$ is not practical due to the noise amplification). Thus, the following change of variables is used to rectify this issue:

$$\begin{pmatrix} \xi_1 \\ \xi_2 \end{pmatrix} = \begin{pmatrix} 1 & 0 \\ -1 & 1 \end{pmatrix} \begin{pmatrix} x_1 \\ x_2 \end{pmatrix} + \begin{pmatrix} 0 \\ -1 \end{pmatrix} \theta \quad (8)$$

The dynamics of the system with new variables is given by:

$$\dot{\chi} = F' \cdot \chi + G' \cdot \theta \quad (9)$$

where $\chi = \begin{pmatrix} \xi_1 \\ \xi_2 \end{pmatrix}$, $F' = \begin{pmatrix} 2\omega & 2\omega \\ -4\omega & -2\omega \end{pmatrix}$, and $G' = \begin{pmatrix} 2\omega \\ 0 \end{pmatrix}$.

According to (9), the unknown variable θ appears in the measurable dynamics (i.e. $\dot{\xi}_1$). In the new coordinates, the unknown variable θ is observable and the nonlinear adaptive observer is given by:

$$\begin{pmatrix} \dot{\hat{\xi}}_1 \\ \dot{\hat{\xi}}_2 \\ \dot{\hat{\theta}} \end{pmatrix} = \begin{pmatrix} 2\omega & 2\omega & 2\omega \\ -4\omega & -2\omega & 0 \\ 0 & 0 & 0 \end{pmatrix} \begin{pmatrix} \hat{\xi}_1 \\ \hat{\xi}_2 \\ \hat{\theta} \end{pmatrix} + \begin{pmatrix} \alpha_1 \\ \alpha_2 \\ 2\gamma_1\omega \end{pmatrix} \tilde{\xi}_1 \quad (10)$$

where $\tilde{\xi}_1 = \xi_1 - \hat{\xi}_1$ and $\alpha_1, \alpha_2, \gamma_1$ are the observer gains.

According to (4), there are three coefficients in the expression for instantaneous power. The first coefficient represents the DC offset (P), the second coefficient represents the coefficient of the cosine function (−P), and the third coefficient represents the coefficient of the sine function (Q). By using (10), the only coefficient that can be estimated is the first coefficient, P. However, there are two more coefficients (−P and Q) that should be estimated. The estimator according to one aspect of the invention for these coefficients is designed as:

$$\dot{\hat{P}} = \gamma_2 \cos(2\omega t) \tilde{p}_{g,inst} \quad (11)$$

$$\dot{\hat{Q}} = \gamma_3 \sin(2\omega t) \tilde{p}_{g,inst} \quad (12)$$

$$\tilde{p}_{g,inst} = p_{g,inst} - [\hat{\theta} - \hat{P}\cos(2\omega t) - \hat{Q}\sin(2\omega t)] \quad (13)$$

Therefore, the hybrid estimator in one aspect of the present invention is given by:

$$\tilde{\xi}_1 = p_{g,inst} - \hat{\xi}_1 \quad (14)$$

$$\dot{\hat{\xi}}_1 = 2\omega\hat{\xi}_1 + 2\omega\hat{\xi}_2 + 2\omega\hat{\theta} + \alpha_1\tilde{\xi}_1 \quad (15)$$

$$\dot{\hat{\xi}}_2 = -4\omega\hat{\xi}_1 - 2\omega\hat{\xi}_2 + \alpha_2\tilde{\xi}_1 \quad (16)$$

$$\dot{\hat{\theta}} = 2\omega\gamma_1\tilde{\xi}_1 \quad (17)$$

$$\tilde{p}_{g,inst} = p_{g,inst} - [\hat{\theta} - \hat{P}\cos(2\omega t) + \hat{Q}\sin(2\omega t)] \quad (18)$$

$$\dot{\hat{P}} = -\gamma_2 \cos(2\omega t)\tilde{p}_{g,inst} \quad (19)$$

$$\dot{\hat{Q}} = \gamma_3 \sin(2\omega t)\tilde{p}_{g,inst} \quad (20)$$

Figure 6:
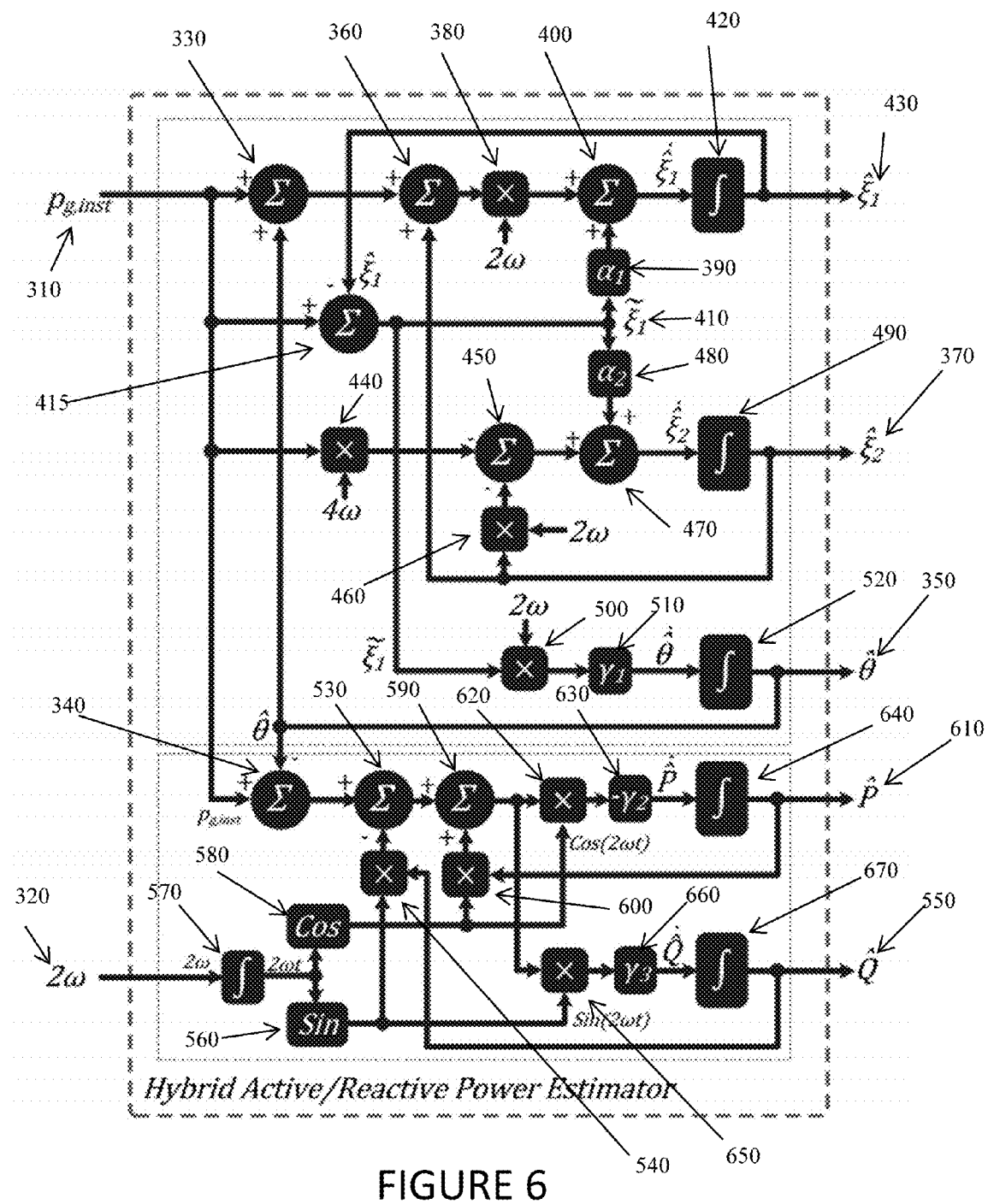
FIG. 6 is a block diagram of a hybrid estimator according to one aspect of the invention.

The hybrid estimator described by (14)-(20) is able to rapidly estimate the active power and reactive power in a single-phase power conditioning system. The block diagram of the proposed hybrid estimator is shown in FIG. 6. Using this estimator to extract the values of the active power and reactive power allows the active/reactive power control loops to have a very high bandwidth. Thus, the estimator provides a practical solution for implementing different real-time grid interconnection functionalities, such as active voltage regulation, active power control and low voltage ride-through.

Referring to FIG. 6, a block diagram of the estimator 300 is illustrated. The inputs to the estimator 300 are the instantaneous grid power ($p_{g,inst}$) 310 (i.e. the instantaneous grid current and grid voltage) and a phase value 2ω 320. The grid power 310 is received by two summation blocks 330, 340. This grid power 310 is added to an estimate for θ 350. The result from summation block 330 is then received by summation block 360 where it is added to an estimate 370 for a value $\xi_2$. The result from summation block 360 is then multiplied by 2ω by way of multiplication block 380. The result from multiplication block 380 is then added to the result of multiplication block 390 by summation block 400. Multiplication block 390 multiplies the estimation error 410 in $\xi_1$ by value $\alpha_1$. The result from summation block 400 is then integrated by integration block 420 to result in the estimate for value $\xi_1$ 430. It should be noted that estimation error 410 for value $\xi_1$ results from subtracting the estimate 430 from the grid power 310 by way of summation block 415.

Also in FIG. 6, the grid power 310 is multiplied by the value of 4ω by multiplied block 440. The negative of the result of multiplier block 440 is added by summation block 450 to the negative of the result of multiplier block 460. Multiplier block multiplies the estimate 370 for $\xi_2$ by 2ω. The result of summation block 450 is then added by summation block 470 to the result of multiplying estimation error 410 for value $\xi_1$ by value $\alpha_2$ 480. The result of summation block 470 is then integrated by integrator block to result in estimate 370 for value $\xi_2$.

It should be noted that estimate 350 for value θ is calculated from estimate error 410. Estimate error 410 is multiplied by 2ω by multiplier block 500. The result is then multiplied by value $\gamma_1$ 510 and is then integrated by integrator block 520. This results in estimate 350 for value θ.

As noted above, the grid power 310 is received by summation block 340. The result of this summation block 340 is added by summation block 530 to the negative of the result of multiplication block 540. Multiplication block 540 multiplies estimate 550 for the Q coefficient with the value of sin(2ωt). As can be seen, sin(2ωt) results from function block 560 which receives 2ωt from integration block 570. Integration block 570 receives value 2ω 320. The resulting 2ωt from integration block 570 is also received by function block 580 to result in cos(2ωt).

Returning to summation block 530, the result of this is added by summation block 590 to the result of multiplication block 600. Multiplication block 600 multiplies cos(2ωt) (from function block 580) with the estimate 610 for the P coefficient. The result of summation block 590 is multiplied by cos(2ωt) by multiplier block 620 and the result of this is multiplied by value −$\gamma_2$ 630. Finally, the result is integrated by integration block 640 to result in estimate 610.

It should further be noted that the result of summation block 590 is also multiplied by sin(2ωt) by multiplier block 650. The result from this multiplier block 650 is multiplied by value $\gamma_3$ 660. Integrator 670 then integrates the result to arrive at estimate 550 for the Q coefficient.

Figure 7:
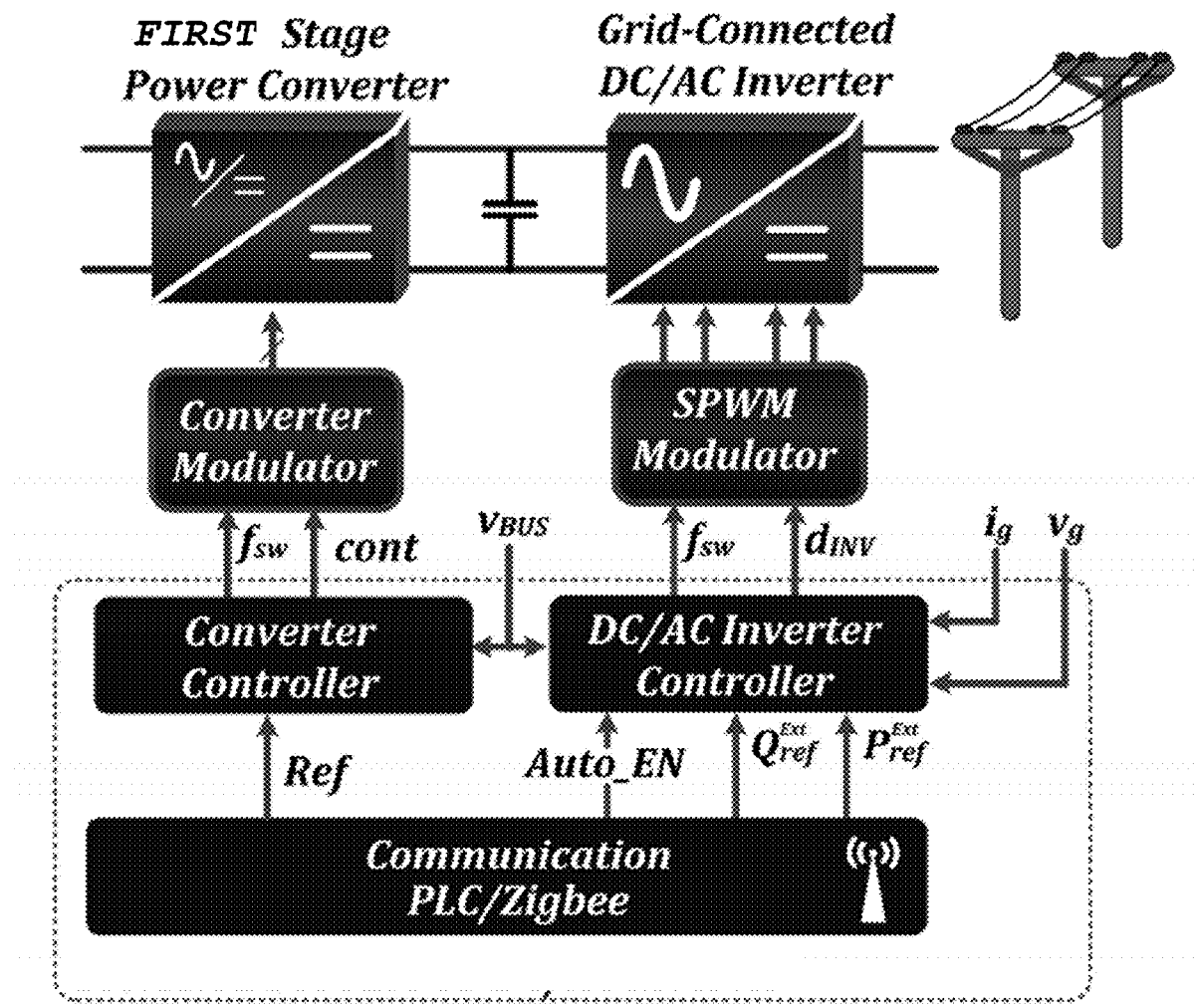
FIG. 7 is a block diagram of a grid-connected DC/AC inverter in a power conditioning system.

Referring to FIG. 7, illustrated is a block diagram of a grid-connected DC/AC inverter in the power conditioning system according to one aspect of the invention. According to FIG. 7, the control system of the power conditioning system includes the DC/AC inverter controller, the DC/AC inverter modulator (usually a Sinusoidal PWM (pulse-width modulation) or SPWM is used), and a communication unit.

The power conditioning system communicates with other components of the smart grid through the communication unit. Two common types of communication for this application are Power Line Communication (PLC) and wireless RF-communication (one of the common types of RF-communication is Zigbee-protocols based communication).

Figure 8:
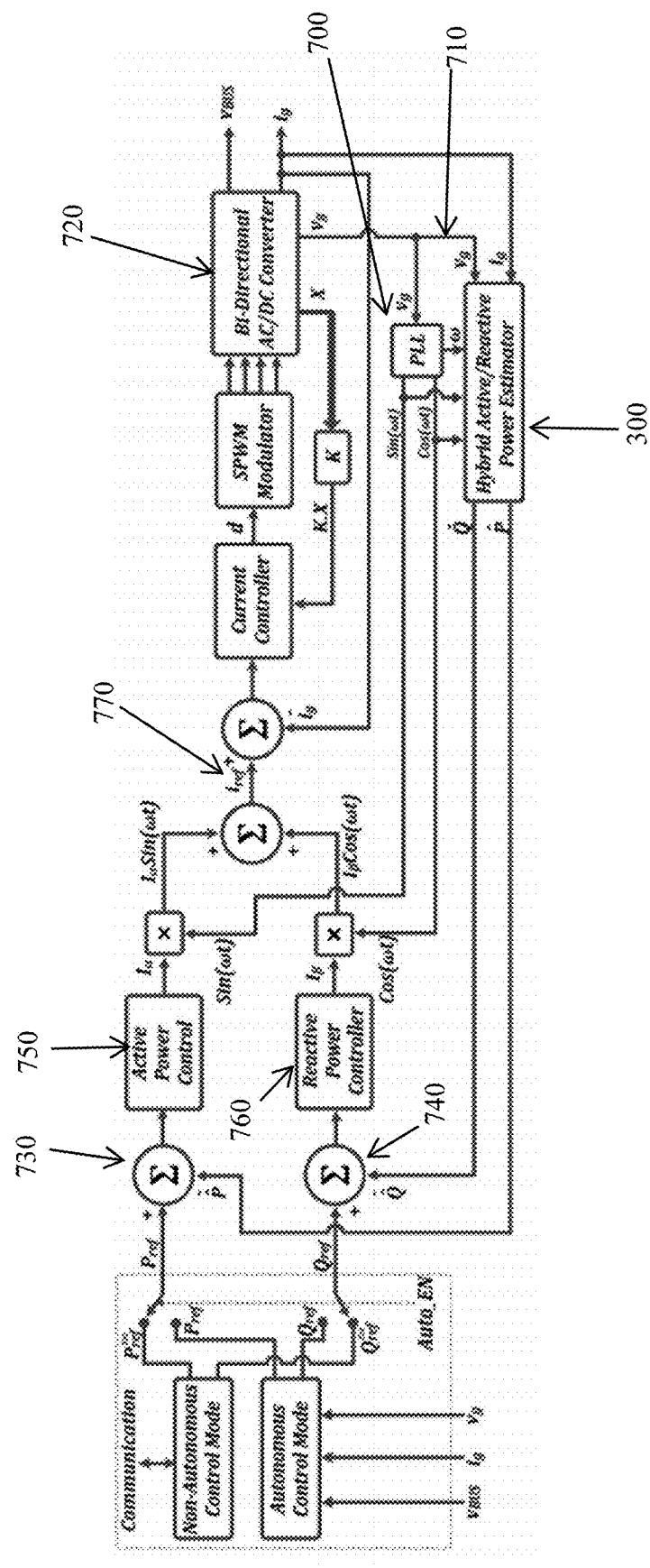
FIG. 8 is a block diagram of a DC/AC converter control system according to one aspect of the invention.

Referring to FIG. 8, illustrated is a grid-connected DC/AC inverter closed-loop control system. The grid-connected DC/AC inverter can operate either in autonomous mode or in non-autonomous mode. In autonomous mode, the reference values for the active power and reactive power are adaptively generated based on the grid conditions detected by the grid-connected DC/AC inverter. In contrast, in non-autonomous mode, the reference values for the active power and reactive power are received from the communication unit. The signal "Auto_EN" determines whether the control system operates in autonomous mode or non-autonomous mode. As can be seen from FIG. 8, the active power and reactive power are estimated by using the hybrid estimator discussed above. The feedback signals from the estimator (i.e. the estimated values for P and Q coefficients) are compared to the reference values for the active power and reactive power (i.e. the reference values for the P and Q coefficients). These reference values are produced either based on grid conditions as detected by the converter in autonomous mode, or are determined based on input from the communication unit in non-autonomous mode. In autonomous mode, the main concern is mainly to provide active grid stabilization in a real-time manner. In non-autonomous mode, the main goal is to perform energy management with the aid of the communication unit.

As can be seen from FIG. 8, the estimator 300 receives the values for $\cos(\omega t)$ and $\sin(\omega t)$, as well as $\omega$, from a PLL (phase-locked loop) module 700. This PLL module 700 receives the grid voltage 710 from a bi-directional AC/DC converter 720. This converter 720 is connected to the power grid 50. The estimates for the P and Q coefficients or values are produced by the estimator 300 and are subtracted from the reference values for these coefficients by summation blocks 730, 740. The result from summation block 730 is then received by an active power control block 750. The result from summation block 740 is received by a reactive power control block 760. The outputs of these control blocks 750, 760 are then used to calculate a reference current 770. The reference current 770 is then used in conjunction with the grid current to determine whether active or reactive power is to be sent to the grid.

Figure 9:
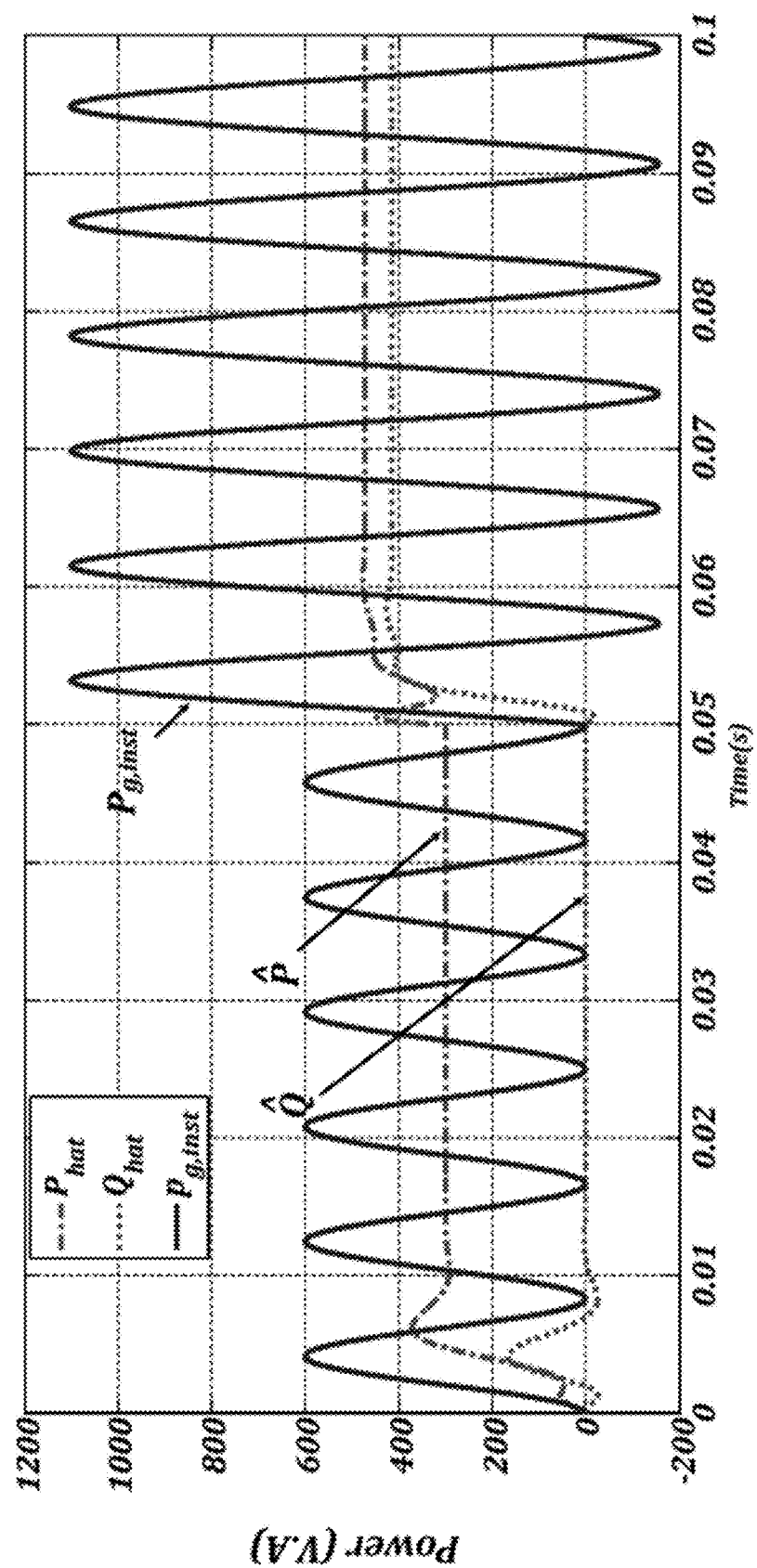
FIGS. 9 and 10 illustrate the transient performance of the hybrid estimator.
Figure 10:
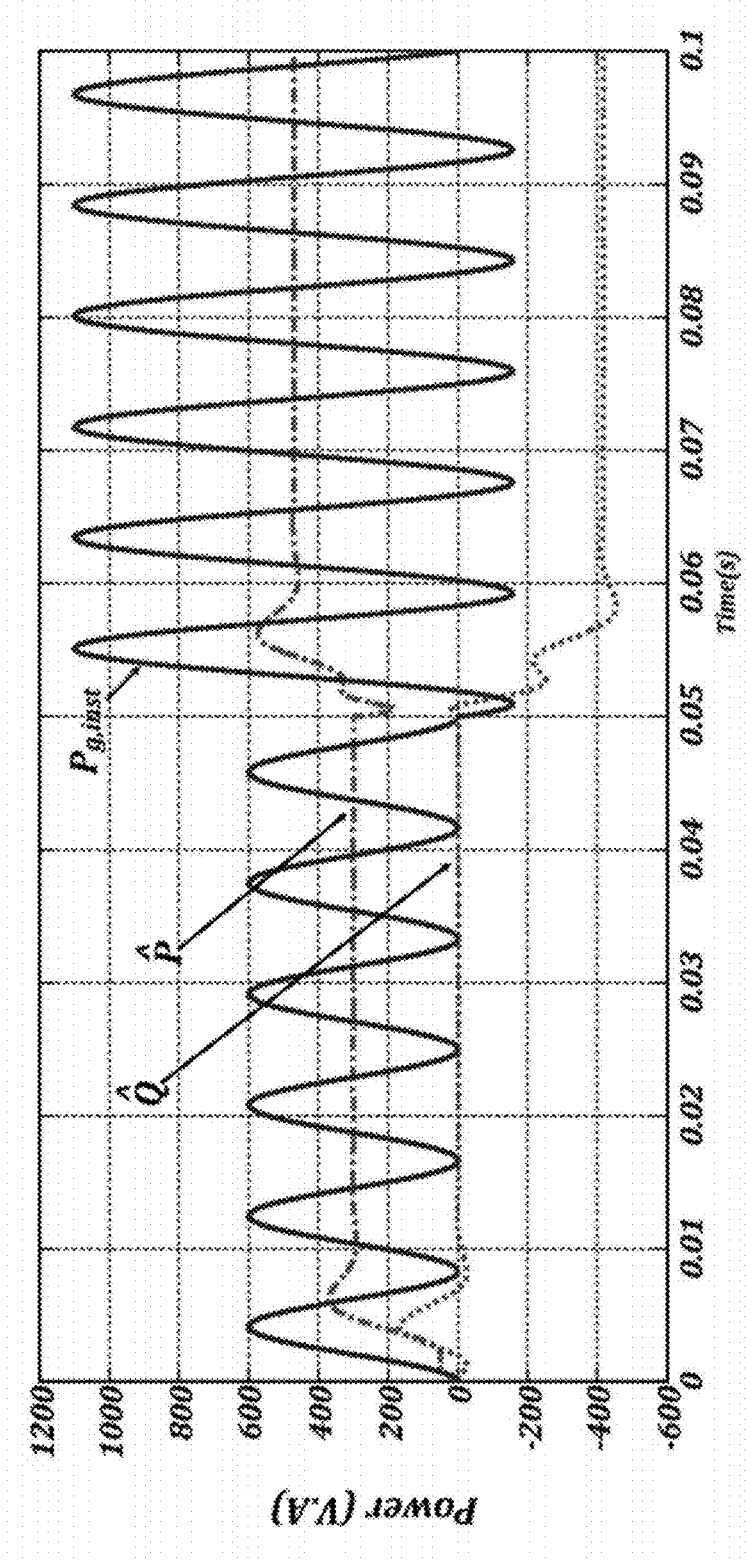
Figure 11:
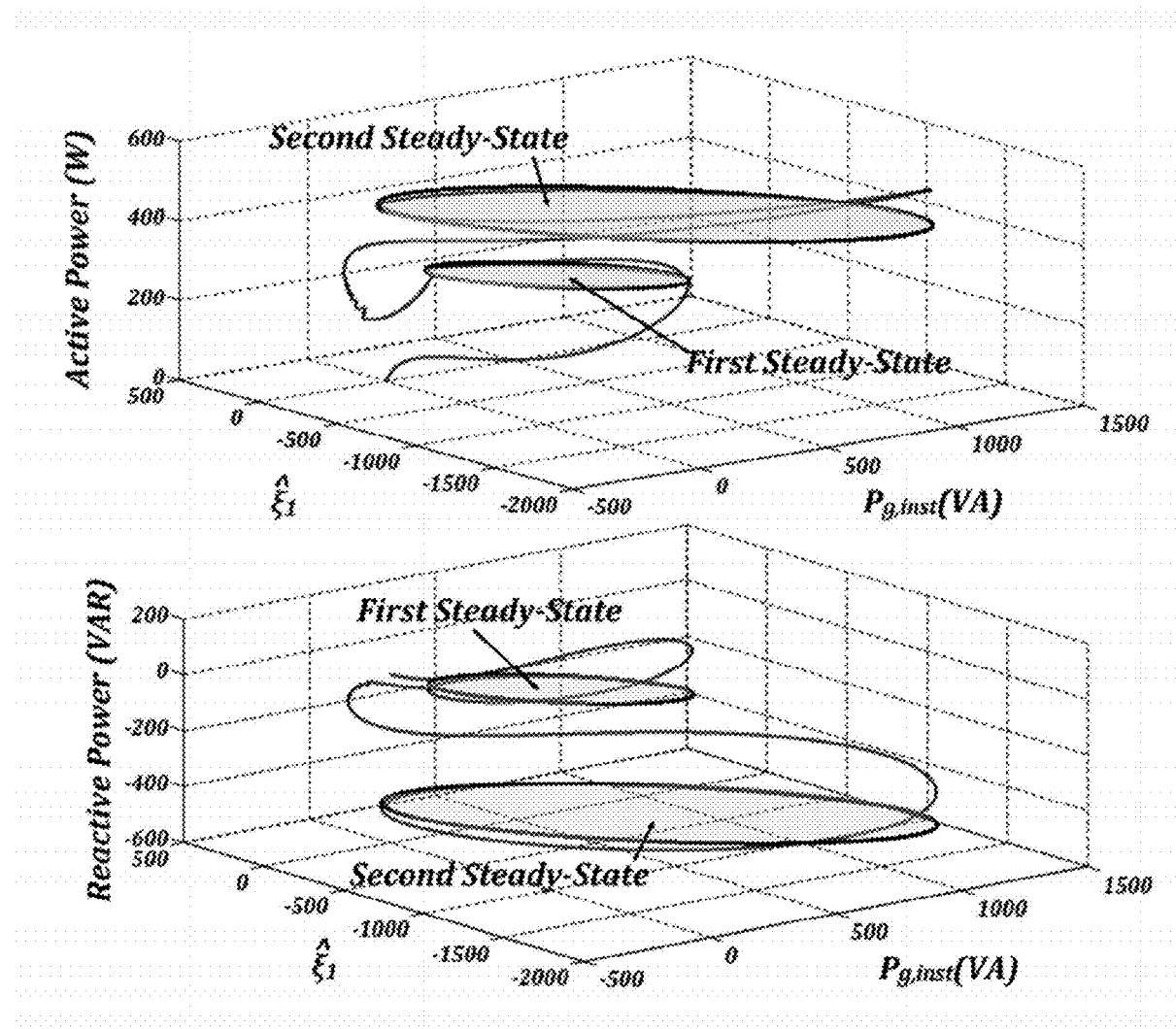
FIG. 11 illustrates the trajectories of the active and reactive power during transients for the estimator.

Regarding the performance of the hybrid estimator described above, experimental results have shown that the estimator is able to quickly estimate both active and reactive power. FIG. 9 and FIG. 10 show the transient performance of the hybrid estimator. FIG. 9 shows the transient performance of the estimator for a positive step change in active power and a positive step change in reactive power. FIG. 10 shows the transient performance for the estimator for a positive step change in active power and a negative step change in reactive power. From FIG. 9 and FIG. 10, it can be seen that the estimator is able to estimate the active and reactive power very quickly. Trajectories of the active power and reactive power during transients are illustrated in FIG. 11.

Figure 12:
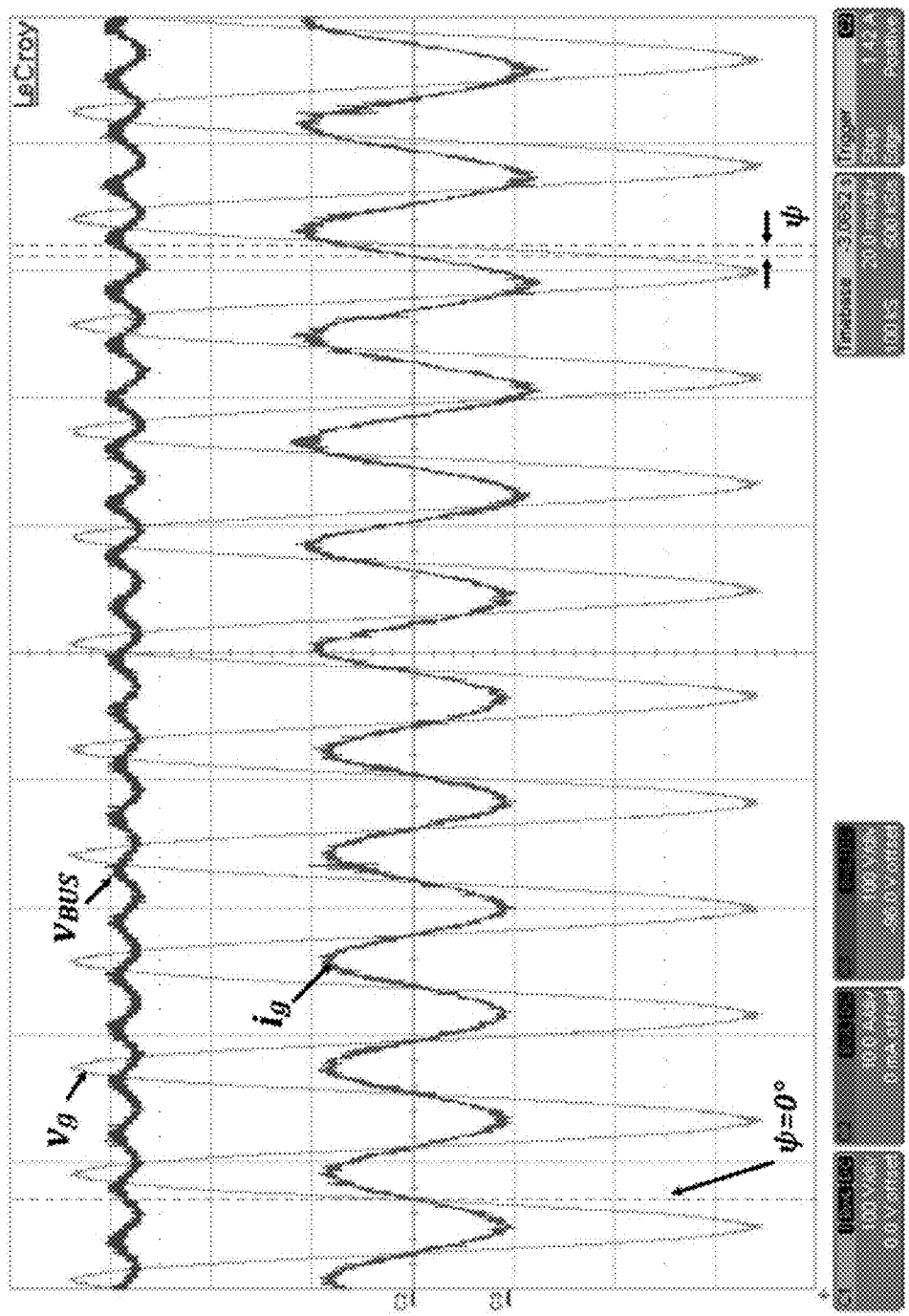
FIGS. 12 and 13 illustrate transient waveforms for a prototype of the grid connected inverter control system.
Figure 13:
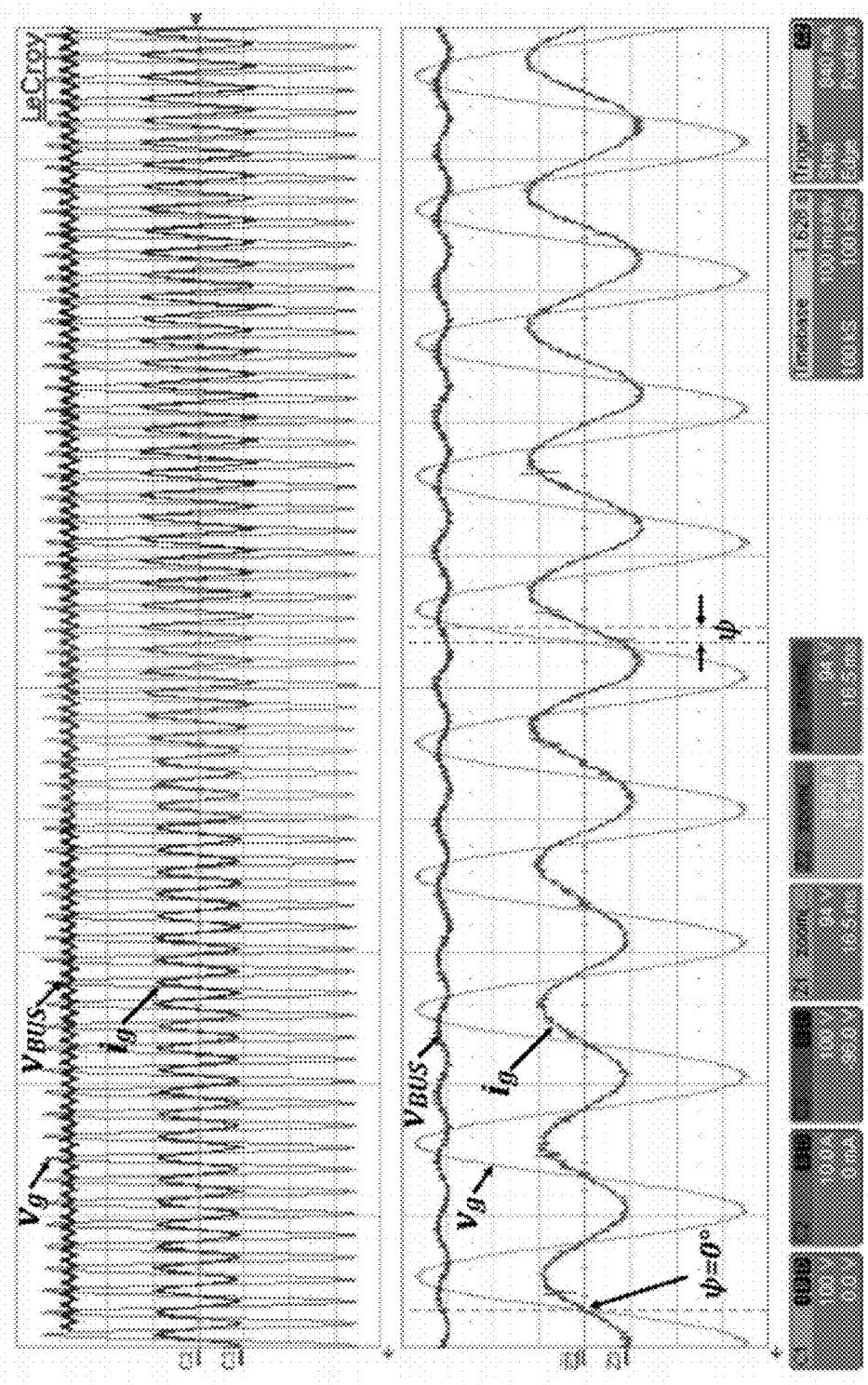

An experimental prototype of the grid-connected DC/AC inverter has been implemented in order to evaluate the performance of the active/reactive power control method using the estimator. The results of these experiments are shown in FIGS. 12 and 13. In FIG. 12, transient waveforms of the grid-connected inverter for a leading power factor are shown. FIG. 13 shows the transient waveforms of the grid-connected DC/AC inverter for a lagging power factor.

Figure 14:
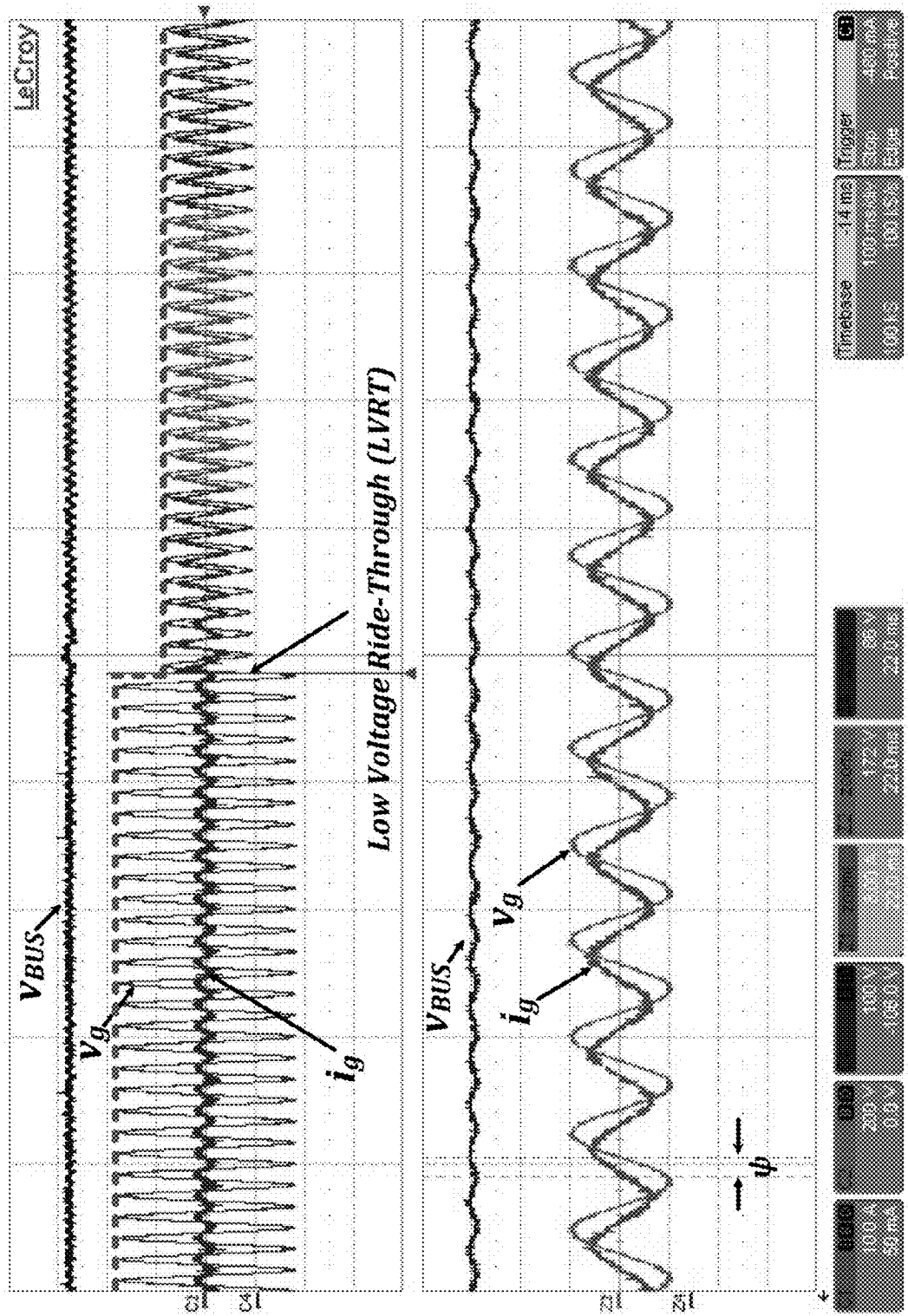
FIGS. 14 and 15 show the performance of the inverter for Low Voltage Ride Through (LVRT) of the grid voltage.
Figure 15:
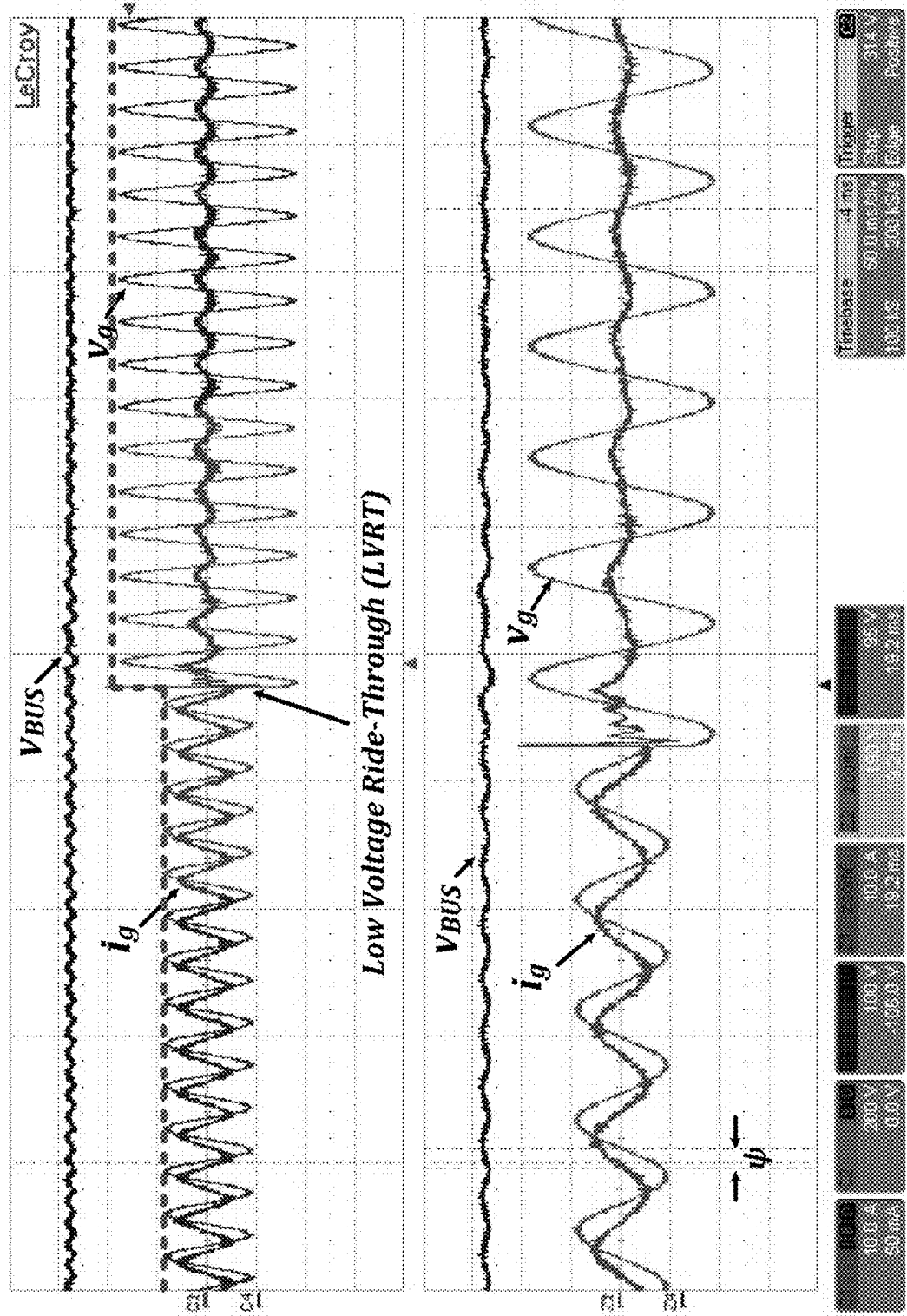

The capability of supporting the grid under fault/disturbance conditions is illustrated in FIG. 14 and FIG. 15. FIG. 14 and FIG. 15 show the performance of the inverter when the grid voltage collapses (e.g., grid voltage may collapse under transients during active/reactive load changes). Under the normal conditions, the converter should be disconnected from the utility grid (i.e., in an islanding condition). However, the closed-loop control system of the present invention can provide Low Voltage Ride Trough (LVRT) capability and still support the grid under low voltage fault. According to FIG. 14 and FIG. 15, when the grid voltage collapses, the closed-loop control system performs reactive power compensation as well as active power control in order to support the grid under faulty conditions.

It should be noted that the estimator as described above may be implemented in software, hardware, or as a combination of both hardware and software. The estimator may be implemented as an application-specific integrated circuit (ASIC) or it may be implemented as software executing on a general purpose processor. If implemented as software, the equations explained above would be used to calculate the various values required.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g. "C") or an object-oriented language (e.g. "C++", "java", "PHP", "PYTHON" or "C#"). Alternative embodiments of the invention may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A control system for controlling a power inverter, the system comprising:
   an active power subcontroller, said active power subcontroller receiving a difference between a reference P value and an estimated P value, an output of said active power subcontroller being used to determine voltage and current outputs of said power inverter;
   a reactive power subcontroller, said reactive power subcontroller receiving a difference between a reference Q value and an estimated Q value, an output of said reactive power subcontroller being used to determine voltage and current outputs of said power inverter;
   an active/reactive power estimator for estimating said estimated P value and said estimated Q value based on outputs of said power inverter, said estimator receiving voltage and current outputs of said power inverter;
   wherein said estimated P value is an estimate of a P value and said reference P value is a reference for said P value, said P value being a DC offset of an instantaneous power of a power grid to which said power inverter is connected and said estimated Q value is an estimate of a Q value and said reference Q value is a reference for said Q value, said Q value being a coefficient of a sine component of said instantaneous power of said power grid;
   and wherein said estimator estimates said estimated P value and said estimated Q value by implementing:

$$\tilde{p}_{g,inst} = p_{g,inst} - [\hat{\theta} - \hat{P}\cos(2\omega t) + \hat{Q}\sin(2\omega t)]$$

$$\dot{\hat{P}} = -\gamma_2 \cos(2\omega t)\tilde{p}_{g,inst}$$

$$\dot{\hat{Q}} = \gamma_3 \sin(2\omega t)\tilde{p}_{g,inst}$$

where
   $p_{g,inst}$ is an instantaneous power for said grid;
   $\hat{P}$ is an estimated value for said P value;
   $\hat{Q}$ is an estimated value for said Q value;
   $\tilde{P}_{g,inst}$ is an estimation error for said instantaneous power for said grid;
   $\hat{\theta}$ is an estimated value for an unknown variable $\theta$;
   $\dot{\hat{P}}$ is a derivative of said estimated value for said P value;
   $\gamma_2$ and $\gamma_3$ are system dependent coefficients;
   $\dot{\hat{Q}}$ is a derivative of said estimated value for said Q value.

2. A control system according to claim 1 wherein said control system operates in an autonomous mode such that said reference P value and said reference Q value are based on conditions of said power grid.

3. A control system according to claim 1 wherein said control system operates in a non-autonomous mode such that said reference P value and said reference Q value are received from an external source.

4. A control system according to claim 3 wherein said external source is a communications unit for receiving communications from outside a power conditioning system which includes said control system.

5. A control system according to claim 1 wherein said power inverter is a bi-directional AC/DC converter.

6. A control system according to claim 1 wherein said power inverter is coupled to said power grid such that said power inverter provides active power to said grid when necessary to stabilize said power grid.

7. A control system according to claim 1 wherein said power inverter is coupled to said power grid such that said power inverter provides reactive power to said grid when necessary to stabilize said power grid.

8. A control system according to claim 1 wherein said estimator further implements:

$$\tilde{\xi}_1 = p_{g,inst} - \hat{\xi}_1$$

$$\dot{\hat{\xi}}_1 = 2\omega\xi_1 + 2\omega\hat{\xi}_2 + 2\omega\hat{\theta} + \alpha_1\tilde{\xi}_1$$

$$\dot{\hat{\xi}}_2 = -4\omega\xi_1 - 2\omega\hat{\xi}_2 + \alpha_2\tilde{\xi}_1$$

$$\dot{\hat{\theta}} = 2\omega\gamma_1\tilde{\xi}_1$$

where
   $\tilde{\xi}_1$ is an estimation error for instantaneous grid power;
   $\xi_1 = P_{g,inst}$;
   $\hat{\xi}_1$ is an estimated value for said instantaneous grid power;
   $\dot{\hat{\xi}}_1$ is a derivative of said estimated value for said instantaneous grid power;
   $\dot{\hat{\xi}}_2$ is a derivative of an estimate for $\xi_2$;
   $\hat{\xi}_2$ is an estimated value for an intermediate variable $\xi_2$;
   $\alpha_1$, $\alpha_2$ and $\gamma_1$ are observer gain coefficients;
   $\hat{\theta}$ is an estimated value of an unknown variable $\theta$;
   $\dot{\hat{\theta}}$ is a derivative of an estimated value for said unknown variable $\theta$.

9. A control system according to claim 1 wherein said estimator receives outputs of a phase-locked loop module, said outputs of said phase-locked loop module being used by said estimator to estimate said estimated P value and said estimated Q value.

10. A control system according to claim 1 further comprising a first summation block for subtracting said estimated P value from said reference P value, and an output of said first summation block being received by said active power subcontroller.

11. A control system according to claim 10 further comprising a second summation block for subtracting said estimated Q value from said reference Q value, and an output of said second summation block being received by said reactive power subcontroller.

12. A control system according to claim 11 wherein said reference P value and said reference Q value are derived from said voltage and current outputs of said power inverter.

13. A control system according to claim 11 wherein said reference P value and said reference Q value are derived from data received from a communications unit.

* * * * *